Dec. 6, 1949 C. B. WILLIAMS, JR., ET AL 2,490,289
APPARATUS FOR WASHING GLASS SHEETS
Filed Dec. 30, 1947 2 Sheets-Sheet 1

INVENTORS
Carl B. Williams, Jr.
and Walter H. Meyer
BY
Nobbe & Swope
ATTORNEYS

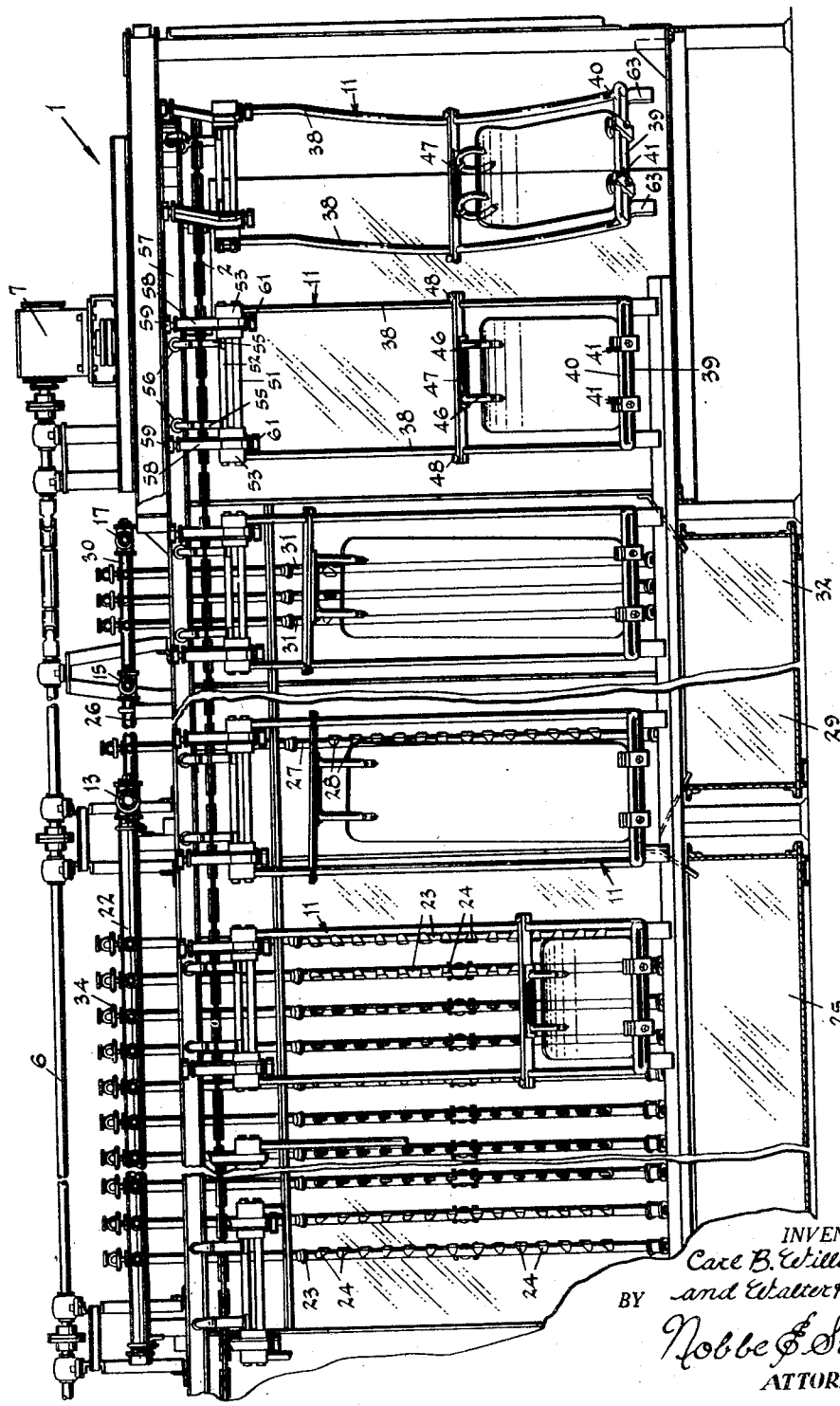

Patented Dec. 6, 1949

2,490,289

UNITED STATES PATENT OFFICE 2,490,289

APPARATUS FOR WASHING GLASS SHEETS

Carl B. Williams, Jr., and Walter H. Meyer, Toledo, Ohio, assignors to Libbey-Owens-Ford Glass Company, Toledo, Ohio, a corporation of Ohio Application December 30, 1947, Serial No. 794,700

4 Claims. (Cl. 198—177)

1

This invention relates to glass handling apparatus and in particular to apparatus for conveying glass sheets of either curved or flat form through a series of processing zones.

Glass sheets that are to be used in the manufacture of safety glass, i. e. glass that is laminated with one or more layers of plastic interposed between and bonded to glass sheets, must be very thoroughly cleaned before it is assembled with the plastic interlays. Any failure to completely clean the glass surfaces that are to be bonded to the plastic interlay results in an inferior bond and in discoloration or spots that make the resulting laminated glass commercially unacceptable.

In the interests of economy in manufacture it is desirable to reduce the labor of washing the glass to an absolute minimum and further to reduce the amount of handling of the glass both during and subsequent to the washing operation to prevent further contamination of the cleansed surfaces.

The principal object of this invention is to provide an improved conveying apparatus that is suitable for carrying glass sheets through a plurality of processing zones.

Another object of the invention is to provide a conveying apparatus that not only conveys the glass sheets through the processing zones but also accurately maintains a preselected orientation and spacing between the glass sheets and the processing equipment located in the various zones.

Another object of the invention is to provide means that may be readily adjusted to accommodate the apparatus to glass sheets of various lengths and curvatures.

These and more specific objects and advantages are apparent from the following description in which reference is made to the accompanying drawings.

According to the invention, the glass sheets to be washed or otherwise processed are carried on an open generally rectangular frame that, being suspended from an overhead conveying mechanism, is provided with means for preventing lateral swinging movement, and that has its side members curved to conform generally to the curvature of the glass sheets being processed. An adjustable cross member spanning the space between the side members of the frame has depending portions for engaging the top portion of the glass sheet and is, furthermore, readily adjustable up and down along the length of the frame so that glass sheets of various lengths may

2 be readily processed. The depending portions of the cross member may consist of curved fingers, the tips of which engage the sides of the glass sheet to position it on the frame. The bottom cross piece of the frame has upwardly-directed notched members that receive the lower edge of the glass sheet and locate it with respect to the frame. A suitable driving and conveying means carries the frames through a plurality of processing zones in which the desired processing operations are performed.

A preferred embodiment of the invention is illustrated in the accompanying drawings.

In the drawings:

Figure 3 is an elevation at enlarged scale showing some of the processing stations and the conveying means extending therethrough.

These specific figures and the accompanying description are intended merely to illustrate the invention but not to impose limitations on the claims.

Figure 1:
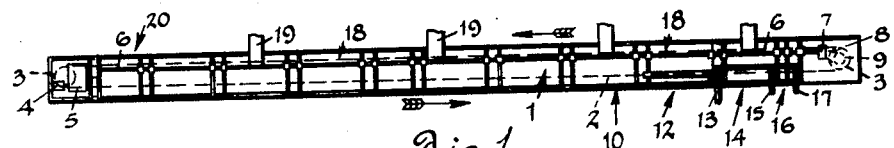
Figure 1 is a plan view, at reduced scale, showing the general arrangement of the conveying mechanism and the processing stations through which the glass sheet being processed is successively carried.

Referring now to Figure 1, the improved conveying apparatus is included in a machine for washing, rinsing and drying glass sheets. The complete machine includes an elongated skeleton frame 1 which serves to support a conveyor system that is driven by a chain 2 indicated by the dotted line in Figure 1. At each end of the frame 1 the chain 2 passes around a drive sprocket 3. The sprockets 3 are driven by a motor 4 that is connected through a gear reduction 5 leading to the sprocket 3 at the adjacent end of the frame 1 and that is connected through a series of drive shafts 6 extending along the top of the frame 1 to a suitable gear box 7 located at the far end of the frame 1. The gear box 7 has a downwardly directed shaft, the lower end of which carries a small sprocket to receive a chain 8 leading to and driving a larger sprocket 9 that is fixed on the same shaft as the adjacent one of the drive sprockets 3.

The glass sheets to be washed are brought to a loading station which may include bays 10 of the frame 1 at which station they are placed on frames 11 (Figure 2) that are carried on the conveyor system and driven along by the chain 2. From the loading station in the bays 10 the glass sheets pass through a washing station or zone 12. In this zone the glass is sprayed with a solution of detergent in water that is supplied through a pipe 13. A detergent capable of dissolving the foreign material on the glass surfaces is used in sufficient strength so that the glass is cleaned without the necessity of being scrubbed other than by the force of the sprays. From the washing zone 12 the glass passes to a first rinsing zone 14 where it is thoroughly rinsed by city water supplied through a pipe 15. In this rinsing zone the water serves to rinse away all the traces of detergent that may have been carried over from the preceding washing zone. Following the first rinsing zone 14 is a second rinsing zone 16 to which distilled water is supplied through a pipe 17. The distilled water serves to rinse away all traces of the city water so that when the glass is subsequently dried by evaporation there will be no residue of foreign material left on the surface of the glass. From the second rinsing zone 16 the glass sheets pass around the end of the conveyor system and start back along the back side of the frame 1 where they pass through a series of drying chambers 18 supplied with hot dry air through ducts 19. After the glass leaves the last of the drying zones 18 it is carried to an unloading station 20 where it is removed from the frames 11. If desired, an inspection station may be interposed between the last drying zone and the unloading station 20.

Figure 2:
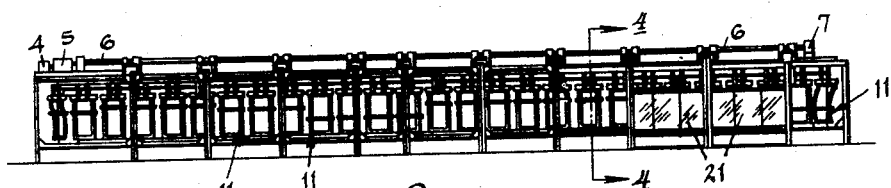
Figure 2 is an elevation of the front side of the improved apparatus.

Figure 2, a front elevation of the complete apparatus, shows the frame 1 as being open throughout its length except for the washing and rinsing zones which are enclosed by panels 21 to prevent loss of washing and rinsing solutions.

Referring now to Figure 3, which shows the washing and rinsing zones at enlarged scale, the solution of detergent in water is supplied through the pipe 13 to a header or manifold 22 that supplies a plurality of spray tubes 23. There are spray tubes located on each side of the path of travel of the frames 11 carrying the glass sheets so that both sides of the sheets are subjected to the cleaning fluids. Those of the spray pipes 23 that are located near the entrance to the washing zone 12 have their nozzles 24 directed in the direction of the travel of the glass sheets so that little or none of the solution is splashed out of the entrance to the zone. The intermediate ones of the spray pipes 23 have their nozzles 24 directed straight against the glass surfaces to be washed. The spray pipes 23 located at the exit end of the washing zone 12 have their nozzles 24 directed contra to the direction of movement of the frames 11 to prevent spraying wash water through the exit of the washing zone 12 into the rinsing zone 14. The wash water that drains from the sheets being washed is collected in a tank 25 connected to a suitable drain or other disposal system. For best results the spray tubes 23 carrying the wash water are spaced on approximately seven-inch centers so that each of the jets or sprays from the nozzles 24 acts on the glass sheet independently of its neighbors.

The first rinse water which may be city water or water from some other convenient source is supplied through the pipe 15 to a header 26 that supplies a series of spray tubes 27 of which only one is shown in Figure 3. The rinse water spray tubes 27 are spaced on six-inch centers and those nearest the entrance and exit of the rinsing zone 14 have their nozzles 28 directed away from such entrance and exit to minimize any spraying of water into the adjacent zones.

The used rinse water from the glass sheets is collected into a tank 29 and from the tank is lead to a suitable drain.

After the glass leaves the first rinsing chamber 14 it enters the second rinsing chamber 16 where it is sprayed with distilled water fed through the pipe 17, a header 30 and spray pipes 31. The distilled water that drains from the glass sheets runs into a tank 32 which is connected to the drain. From the second rinsing zone 16 the glass sheets pass around the end of the frame 1 and start back along its back side through the drying zones 18.

Figure 4:
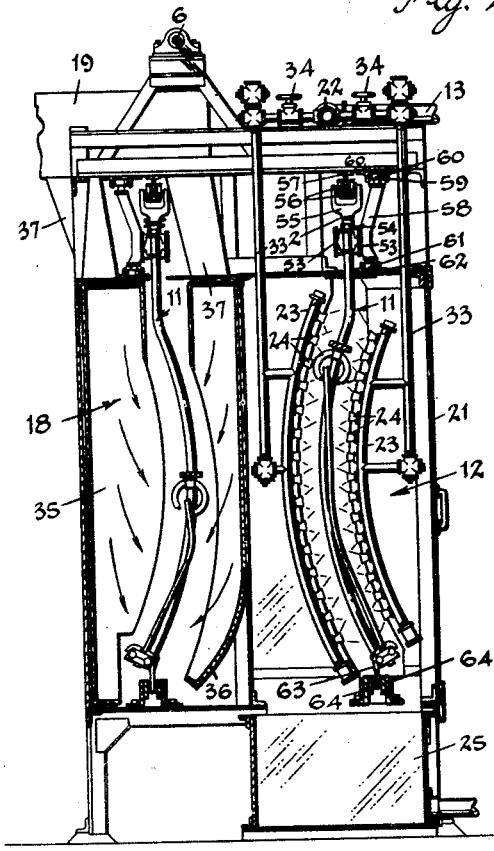
Figure 4 is a transverse section of the improved apparatus taken substantially along the line 4—4 of Figure 2.

Referring to Figure 4, it will be seen that the frames 11 that carry the glass sheets through the various processing zones are curved to conform generally to the curvature of the glass sheets being processed. The spray tubes 23 are also curved to the same curvature so that the nozzles 24 are brought into close and uniform spacing from the glass sheet being washed.

As may be seen in Figure 4 the spray tubes 23 are carried on the lower ends of pipes 33 each of which is supported on cross members of the frame 1 and is connected into the header 22 through valves 34. The valves 34 control the distribution of the wash water between the spray pipes 23 and may be adjusted to secure the proper pressure at the spray nozzles 24 for most efficient washing.

After the glass has been washed and rinsed it is passed through the series of drying zones 18 one of which is shown in cross section in Figure 4. Each of the drying zones consists of shaped sheet metal housings 35 and 36 which at their upper ends are connected through downleads 37 to the ducts 19 that supply the heated and dried air for evaporating the distilled water from the surfaces of the glass. The sheet metal housings 35 and 36 are shaped so that the air passing through them is delivered against the flat sides of the glass. Furthermore, the end walls of the housings 35 and 36 are fashioned to leave openings that just admit the frames 11 carrying the glass sheets.

Figure 6:
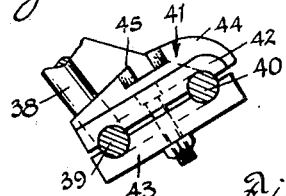
Figure 6 is a fragmentary detail showing one of the members that is mounted at the lower end of the generally rectangular frame for receiving and supporting the lower edge of the glass sheet as it is carried in the frame.

The construction of the frames 11 is shown in Figures 3 and 4. Each of the frames 11 may be formed from a long rod that is bent to a U-shape to provide generally parallel side members 38 and a bottom cross piece 39. A second rod 40 is suitably attached in parallel relationship to the bottom cross piece 39 to provide an open centered shelf or framework to receive lower glass supports 41. Each of the glass supports 41 (see Figure 6) includes an upper member 42 and a lower member 43 that when bolted together clamp to the rods 39 and 40. The upper surface of the upper member 42 is provided with a rubber block 44 the upper surface of which has a notch 45 extending generally parallel to the rods 39 and 40. The notch 45 is of substantially constant depth and has generally vertical sides that diverge in each direction from a relatively narrow central section. The notches 45 of the pair of glass supports 41 serve to locate and secure the lower edge of a glass sheet in position on the conveyor frame 11. The diverging side walls of the notch 45 leave a relatively narrow central section to contact the face of the glass so that a minimum of glass area is covered and thus shielded from the washing and rinsing solutions.

Figure 5:
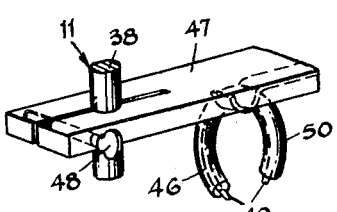
Figure 5 is a fragmentary detail of one end of the adjustable cross member of one of the open generally rectangular conveyor frames.

The upper ends of the glass sheets are guided by curved fingers 46 (Figure 5) that extend downward from an adjustably positioned cross piece 47. The cross piece 47 is clamped to the side rods 38 of the frame 11 as, for example, by slipping the side rods 38 through holes in the end of the cross member 47 and providing wing headed bolts 48 for clamping the cross piece 47 in adjusted position. The fingers 46 are preferably made of substantially C-shaped metallic rods 49 that throughout the greater portion of their lengths are encased in rubber sleeves 50. The tips of each C-shaped rod 49 are left exposed and are rounded so that there is substantially point contact between the glass and the rod thereby minimizing the area that is shielded from the washing action.

The general construction of the head portions of the frames 11 may be understood from Figures 3 and 4. The head portion of each of the frames 11 includes a pair of channel irons 51 and 52 that are held in spaced apart relation at their ends by side plates 53 so that the channel irons 51 and 52 form a horizontally disposed box-like structure. The side rods 38 of the frames 11 have shoulders or flanges near their ends and are threaded so that they may be inserted through vertically aligned holes in the webs of the channel irons 51 and 52 and secured thereto as by tightening nuts 54 onto the threaded sections of the rods.

A pair of yokes 55 extend upwardly from the upper channel iron 52 of each of the frames 11 and at their upper ends are provided with inwardly-directed axles journalling rollers 56 that travel on the upper surface of the lower flange of an I-beam 57. The I-beam 57 is one of a series of similar beams that are mounted in end-to-end relation in the frame 1 to provide an endless track that passes above a plurality of processing zones. The yokes 55 are attached to links of the chain 2 which serves to pull the frames along the endless track formed by the I-beams 57. At the ends of the frame 1 the I-beams 57 are bent to substantially the same curvature as the periphery of the sprockets 3 so that the frames 11 may follow around the ends of the frame 1 without interference with the sprockets 3 or straining the chain 2.

Because of the relatively close clearance between the frames 11 and the spray tubes 23, 27 and 31 it is necessary that the frames 11 be prevented from swinging sidewise as they move through the processing zones. To provide the additional support to eliminate any swinging motion of the frames 11 a pair of arms 58 attached to the side plates 53 joining the channel irons 51 and 52 are provided. These arms 58 extend upwardly alongside the yokes 55 and at their upper ends are provided with vertical axles on which are journalled rollers 59 adapted to run between a pair of angle irons 60 that together form a U-shaped track extending parallel to the I-beams 57. The lower ends of the arms 58 carry rollers 61 that run between vertical surfaces of a pair of angle irons 62 that together form a track extending parallel to the path of movement of the frames 11. The rollers 59 and 61 mounted on the ends of the arms 58, by engaging the vertical surfaces of the angle irons 60 and 62 forming the auxiliary tracks, provide sufficient restraint against lateral swinging motion of the frames 11 so that they will accurately follow their intended path through the processing zones. The angle irons 60 and 62 forming the auxiliary tracks do not extend around the ends of the frame 1 but rather are interrupted near the ends and the ends of the angle irons are fanned out to provide funnel-shaped entering guides to insure accurate engagement between the rollers 59 and 61 and the angle iron tracks as the frames 11 are driven along the endless track.

As an additional safeguard in guiding the frames 11 through the various processing zones the frames are at their bottom ends provided with depending tabs or plates 63 that fit and travel between guide rails 64. Normally, there is no contact between plates 63 and the guide rails 64 because the frames 11 are accurately guided by the rollers 59 and 61 journalled on the ends of the arms 58. The ends of the guide rails 64 at the ends of the processing stations are fanned out to provide entering guides to insure accurate registration of the plates 63 with respect to the rails 64 as the frames 11 follow along their path of movement.

This arrangement of guiding means for the frames 11 provides sufficient control over the path of movement of the frames so that the spray tubes 23, 27 and 31 may be located closely adjacent the frames and so that the partitions between the drying chambers 18 may have a minimum of open area at their ends without danger of interference between the frames and the stationary parts of the processing equipment. The rigidity of the control over the path of movement is sufficient so that wide variations in the weight of the glass sheets being handled or in the lengths of the sheets does not appreciably affect the path of movement followed by the frames 11. Therefore, the only adjustment that need be made in the apparatus when going from one length of glass sheets to another is merely adjusting the height of the cross members 47 on the side rods 38 of the frames 11. This adjustment—made by loosening the wing bolts 48, sliding the cross member 47 to its new location, and retightening the wing bolts—is so easily made that it is unnecessary to stop the conveyor when changing from one length of glass sheet to another. Rather, the operator merely goes along the front of the machine ahead of the loading station and sets the cross members 47 as the frames are driven toward the loading station.

Figure 7:
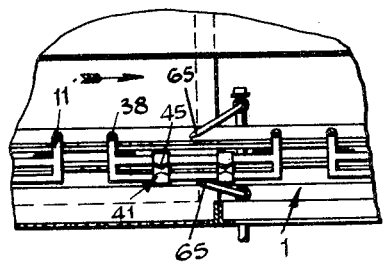
Figure 7 is a fragmentary horizontal section of a portion of one of the drying chambers to illustrate the position of air jets that serve to remove drops of water which may collect along and adhere to the bottom edge of a sheet of glass.

As the glass sheets pass through the drying zones 18 the circulated air tends to drive water drops on the glass toward the bottom edge of the glass as well as evaporate the film of moisture from the surface of the glass. The water drops collecting along the bottom edge of the glass, which are commonly known as "tail" water, are removed by a pair of air nozzles 65 (Figure 7) that are located near the bottom of one of the drying chambers 18 and that are directed toward the oncoming glass sheets so that the water is driven along the bottom edge of the glass sheet and off its lower rear corner.

The improved apparatus provides an efficient glass handling arrangement for carrying the glass through a plurality of processing zones and for accurately locating the glass as it passes through each of the zones. The apparatus is easily adjustable to accommodate glass sheets of various lengths and, furthermore, exposes practically all of the area of the glass to the processing operations performed in the various processing zones so that all portions of each sheet are completely processed.

Various modifications in the structure shown may be made in adapting the apparatus for specific installations without departing from the spirit and scope of the invention.

Having described the invention, we claim:

1. In an apparatus for carrying glass sheets during a processing operation, in combination, an open generally rectangular frame, an endless track passing over a plurality of processing zones, rollers on a head portion of the frame for suspending it from the track, means for moving the frame along the endless track, upwardly-directed notched members attached to a lower part of the frame for receiving the lower edge of a sheet of glass to be washed, and a cross member adjustably mounted on parallel sides of the frame, said cross member having portions that engage the upper portion of the glass sheet to hold it in position in the frame.

2. In an apparatus for carrying glass sheets during a processing operation, in combination, an open generally rectangular frame, an endless track passing over a plurality of processing zones, rollers on a head portion of the frame for suspending it from the track, means for moving the frame along the endless track, upwardly-directed notched members attached to a lower part of the frame for receiving the lower edge of a sheet of glass to be washed, and a cross member adjustably mounted on parallel sides of the frame, said cross member having downwardly-directed curved fingers that partially encircle the top edge of the glass sheet and the tips of which engage the glass sheet to hold it in position in the frame.

3. In an apparatus for carrying glass sheets during a processing operation, in combination, an open generally rectangular frame, means for carrying the frame in generally upright position through a plurality of processing zones, upwardly-directed notched members for receiving and supporting the lower edge of a glass sheet being processed, and a cross member adjustably mounted on the sides of the frame and having portions that engage the upper portion of the glass sheet.

4. In an apparatus for carrying glass sheets during a processing operation, in combination, an open generally rectangular frame, means for carrying the frame in generally upright position through a plurality of processing zones, upwardly-directed notched members for receiving and supporting the lower edge of a glass sheet being washed, a cross member adjustably mounted on side members of said frame and having means for engaging the upper part of the glass sheet, said frame having its side members curved to correspond generally to the curvature of the glass sheets being washed, whereby the cross member when adjusted for any of various lengths of glass sheets positions the glass sheet substantially in the plane of the side members.

CARL B. WILLIAMS, Jr.
WALTER H. MEYER.

REFERENCES CITED

The following references are of record in the file of this patent:

UNITED STATES PATENTS

| Number | Name | Date |
| --- | --- | --- |
| 2,102,667 | Argabrite | Dec. 21, 1937 |
| 2,161,388 | Rosenthal | June 6, 1939 |
| 2,187,498 | Landahl | Jan. 16, 1940 |